(12) United States Patent
Studer et al.

(10) Patent No.: US 11,484,815 B2
(45) Date of Patent: Nov. 1, 2022

(54) FROTH COALESCING (71) Applicant: Hewlett-Packard Development Company, L.P., Spring, TX (US)

(72) Inventors: Anthony D Studer, Corvallis, OR (US); Robert S Wickwire, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 140 days.

(21) Appl. No.: 16/761,574

(22) PCT Filed: Nov. 7, 2017

(86) PCT No.: PCT/US2017/060355
§ 371 (c)(1),
(2) Date: May 5, 2020

(87) PCT Pub. No.: WO2019/093994
PCT Pub. Date: May 16, 2019

(65) Prior Publication Data
US 2020/0269159 A1 Aug. 27, 2020

(51) Int. Cl.
*B01D 19/02* (2006.01)
*B01D 19/00* (2006.01)
*B41J 2/19* (2006.01)
*G05D 9/12* (2006.01)

(52) U.S. Cl.
CPC ......... *B01D 19/02* (2013.01); *B01D 19/0031* (2013.01); *B01D 19/0042* (2013.01); *B01D 19/0063* (2013.01); *B41J 2/19* (2013.01); *G05D 9/12* (2013.01)

(58) Field of Classification Search
None
See application file for complete search history.

(56) References Cited

U.S. PATENT DOCUMENTS

| | | | |
|---|---|---|---|
| 2,847,008 A | 8/1958 | Taylor | |
| 3,853,500 A * | 12/1974 | Gassmann | B01D 19/0063 96/175 |
| 4,593,294 A | 6/1986 | Parisi | |
| 4,811,035 A | 3/1989 | Huliba et al. | |
| 5,108,655 A | 4/1992 | Johns, Jr. et al. | |
| 5,982,290 A * | 11/1999 | Berger | G01F 23/806 340/618 |
| 6,454,835 B1 * | 9/2002 | Baumer | B41J 2/17563 347/92 |

(Continued)

FOREIGN PATENT DOCUMENTS

EP 1919591 B1 5/2008

*Primary Examiner* — Christopher P Jones
*Assistant Examiner* — Phillip Y Shao
(74) *Attorney, Agent, or Firm* — Brooks Cameron & Huebsch PLLC (57) ABSTRACT A froth coalescing unit for a fluid delivery system for a fluid ejection system, the froth coalescing unit including a coalescing chamber including a sump, an inlet to receive froth into the coalescing chamber, the froth comprising a mixture of fluid and gas, the coalescing chamber to coalesce the fluid from the froth with the coalesced fluid collecting at least in the sump, an outlet to communicate coalesced fluid from the sump, and a fluid level sensor to provide a level over a range of levels of coalesced fluid in the coalescing chamber including in the sump.

10 Claims, 5 Drawing Sheets (56) References Cited

U.S. PATENT DOCUMENTS

| | | | |
|---|---|---|---|
| 7,118,206 B1 | 10/2006 | Stockwell et al. | |
| 7,449,051 B2 * | 11/2008 | Olsen | B01D 19/0031 |
| | | | 96/197 |
| 7,874,656 B2 | 1/2011 | Ota et al. | |
| 8,348,397 B2 | 1/2013 | Coffey et al. | |
| 9,044,939 B2 | 6/2015 | Gonzales | |
| 2005/0126282 A1 * | 6/2005 | Maatuk | G01F 23/246 |
| | | | 73/295 |
| 2006/0090645 A1 * | 5/2006 | Kent | B41J 2/19 |
| | | | 96/6 |
| 2007/0292162 A1 | 12/2007 | Regev et al. | |
| 2011/0273288 A1 | 11/2011 | Kochan, Jr. | |
| 2012/0186655 A1 | 7/2012 | Smirnov | |
| 2012/0247324 A1 | 10/2012 | Kramer et al. | |
| 2014/0001102 A1 | 1/2014 | Blendinger | |
| 2014/0362527 A1 | 12/2014 | Best | |

* cited by examiner

FROTH COALESCING

BACKGROUND

In fluid circulation systems, gases may mix with a fluid being circulated and form a froth.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In fluid circulation systems, gases may mix with a fluid being circulated and form a froth. For example, in a fluid ejection system (e.g., a printing system), a fluid (e.g., ink) is circulated to a fluid ejection assembly (e.g., a printhead) from a fluid supply or fluid supply reservoir, with unused fluid being circulated back to the fluid supply. During circulation, such as during ejection of fluid by the fluid ejection assembly, a gas (e.g., air) may mix with the fluid to form a mixture of gas bubbles and liquid referred to herein as a froth. If returned to the fluid supply reservoir, the froth may reduce the accuracy of a fluid level gauge in the supply reservoir and cause unreliable performance, such as by prematurely triggering an out-of-fluid indication.

To reduce or eliminate problems that may be caused by the presence of froth, some fluid circulation systems employ coalescing techniques to eliminate froth, where coalescing is defined as the separation of gas, or gases, from the fluid being circulated, with the resulting separated fluid sometimes being referred to as the coalesced fluid. In some cases, coalescing units are employed to separate the gas from the fluid with the coalesced fluid collecting in a sump and being returned to the fluid supply reservoir. In some instances, coalescing units include a coalescing chamber into which the froth is pumped with the gas separating from the fluid with the passage of time, with the coalesced fluid collecting in the sump and separated gases exiting via a vent. Such coalescing units may be referred to as passive or non-real-time coalescing units. Other coalescing units employ fluid separating or fluid coalescing elements, such as screens or maze-like flow paths, which actively separate gases from the froth and so as coalesce fluid from the froth more quickly and effectively relative to passive type coalescing units. Such coalescing units may be referred to as active or real-time coalescing units.

Some coalescing units may include a single-point or float type switch to monitor when a coalesced fluid level reaches a predetermined fixed level in order to prevent overflowing the coalescing chamber. However, froth in the coalescing chamber reduces the accuracy of such float type systems, and in any case, unknown amounts of coalesced fluid may migrate to the fluid supply reservoir over time and cause unreliable readings of fluid level gages, particularly if the system uses different fluids having different coalescing properties (e.g., different coalescing rates) at different times.

Figure 1:
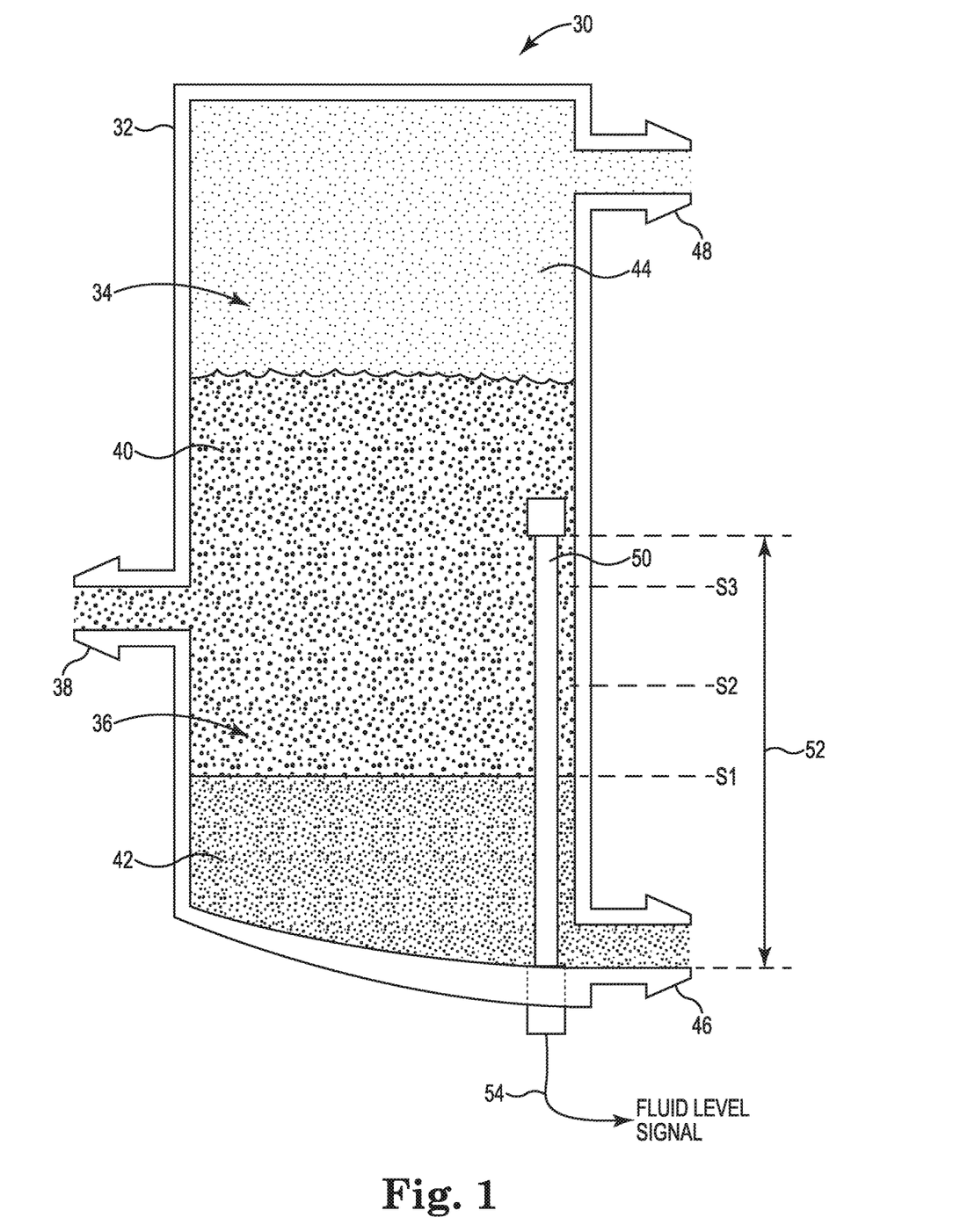
FIG. 1 is a block and schematic diagram generally illustrating a froth coalescing unit, according to one example.

FIG. 1 is a block and schematic diagram generally illustrating a froth coalescing unit 30 for a fluid delivery system, the froth coalescing unit 30 including a multi-point fluid level sensor to provide a level over a continuous range of levels of coalesced fluid collected in the sump of the coalescing unit. In one example, froth coalescing unit 30 may be configured as part of a fluid ejection assembly, such as a printing system, for instance. In one instance, the fluid may be ink.

According to one example, as will be described in greater detail below, the fluid level sensor provides different setpoint levels for different fluids having different coalescing properties. In one example, as will also be described in greater detail below, when included as part of coalescing system, an amount of froth provided to the coalescing unit is adjusted (such as by adjusting a speed of a corresponding pump) based on the coalesced fluid level provided by the multi-point fluid level sensor so as to optimize an amount of fluid coalesced by the froth coalescing unit during operation.

According to one example, as illustrated, froth coalescing unit 30 includes a housing 32 defining a coalescing chamber 34 including a sump portion 36. An inlet port 38 receives froth 40 into coalescing chamber 34, the froth 40 including a mixture of gas (e.g., air) and fluid (e.g., ink), the coalescing chamber 34 to coalesce fluid 42 from froth 38, with the coalesced fluid 42 (indicated by shaded pattern) collecting in sump 36 and separated gas 44 (indicated by the dotted pattern) collecting in an upper portion of coalescing chamber 34. A fluid outlet port 46 communicates coalesced fluid 42 from sump portion 36, and a gas outlet port 48 communicates separated gasses 44 from coalescing chamber 34.

According to one example, froth coalescing unit 30 includes a fluid level sensor 50 to provide a level of coalesced fluid 42 in sump portion 36 over a range of levels 52, such as via a fluid level signal 54. In one example, multi-point level sensor 50 may be an analog sensor. In one example, multi-point level sensor 50 may be a digital sensor. In one example, multi-point level sensor 50 is an inductive sensor having an inductance which varies based on a level of coalesced fluid 42. Depending on characteristics of fluid 42 and froth 40, fluid 42 may coalesce from froth 40 at different rates. In one example, fluid level sensor 50 provides different setpoint levels for different types of fluid 42, such as indicated by setpoint levels "S1", "S2", and "S3", for example, with the setpoint levels being a desired maximum level for the corresponding type of coalesced fluid 42 to attain during operation of coalescing unit.

By employing a multi-point level sensor 50, froth coalescing unit 30, in accordance with examples of the present disclosure enables accurate monitoring of levels of coalesced fluid 42 relative to single-point, float-type switches which, in-turn, enables accurate monitoring of volumes of coalesced fluid 42 provided by froth coalescing unit 30 via fluid outlet port 46. Additionally, multi-point level sensor 50 enables different setpoints to be employed for different fluid types based on properties of the different fluids.

Figure 2:
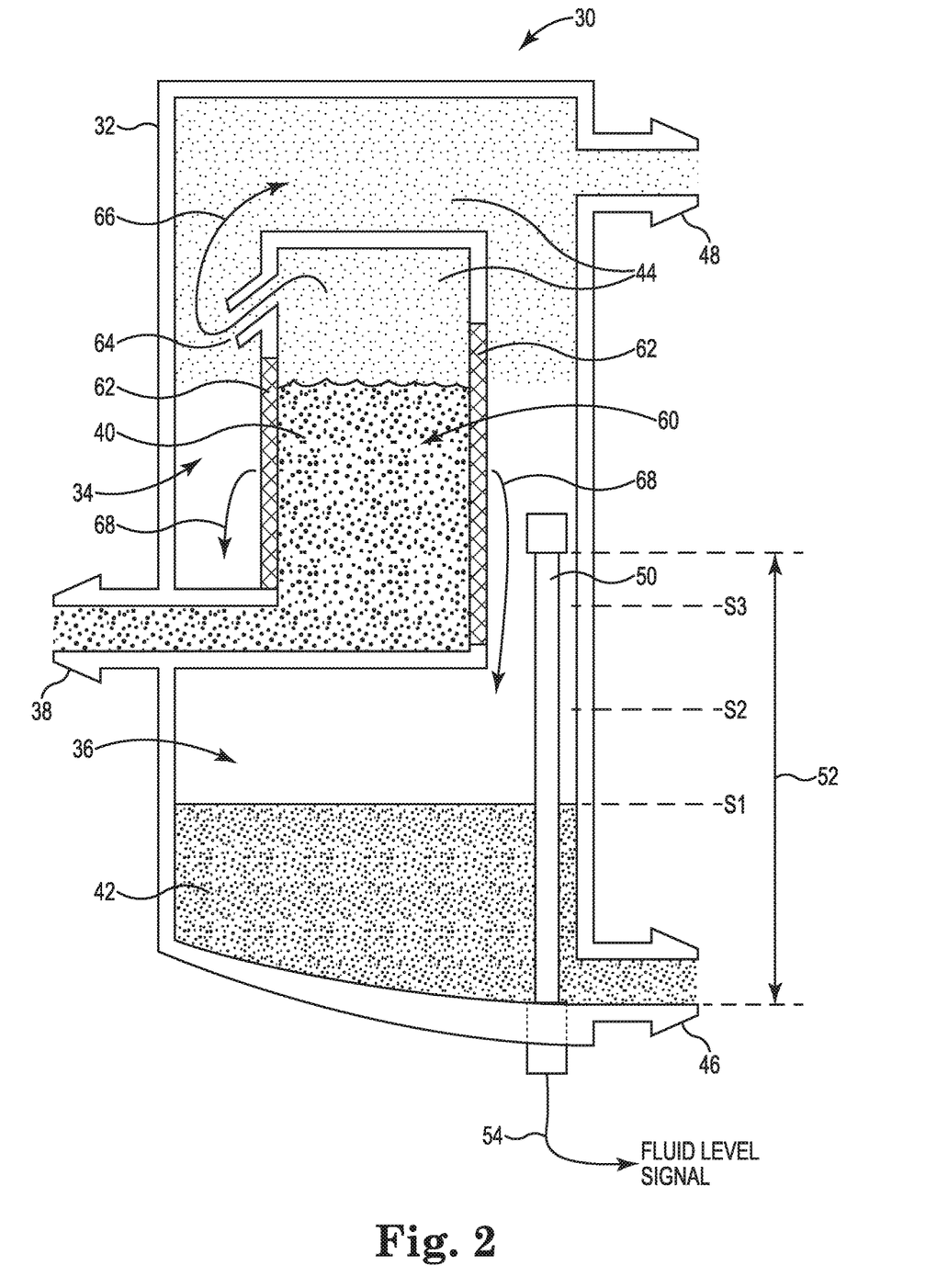
FIG. 2 is a block and schematic diagram generally illustrating a froth coalescing unit, according to one example.

FIG. 2 is a block and schematic diagram generally illustrating froth coalescing unit 30, according to one example, which is similar to the example of FIG. 1, except that coalescing chamber 44 further includes a froth receiving chamber 60, into which inlet port 38 provides froth 40, and which includes coalescing elements to actively coalesce fluid 42 from froth 40. According to one example, inlet port 38 provides froth 40 into a bottom portion of froth receiving chamber 60. As more froth is received via inlet port 38, froth 40 is pushed upward within froth receiving chamber 60. In one example, at least a portion of the vertical sidewalls of froth receiving chamber 60 are porous filter screens 62 (indicated by cross-hatched regions). In one example, filter screens 62 include an abraded surface in contact with froth 40.

As froth 40 is pushed upward and rubs against the abraded surface of filter screens 62, gas bubbles within froth 40 burst, thereby releasing gas 44 from froth 40, with released gas 40 traveling through a vent 64 (as indicated by arrow 66) or through porous filter screens 62 and exiting coalescing chamber 34 via gas outlet port 48. Concurrently, coalesced fluid 42 resulting from the bursting of gas bubbles travels through porous filter screens 62 and travels by gravity to collect in sump portion 36 of coalescing chamber 34 as generally indicated by arrows 68.

As described above, in one example, fluid level sensor 50 provides different setpoint levels for different types of fluid 42, such as indicated by setpoint levels "S1", "S2", and "S3", for example, with the setpoint levels being a desired maximum level for the corresponding type of coalesced fluid 42 to attain during operation of coalescing unit. In some instances, depending on characteristics of fluid 42 being circulated, a setpoint S1 for a first type of fluid 42 may be within sump region 36 and well below filter screens 62, while a setpoint S3 for another type of fluid may be above sump region 36 and extend upward in coalescing chamber 34 and above at least a portion of filter screens 62 of froth receiving chamber 60.

Figure 3:
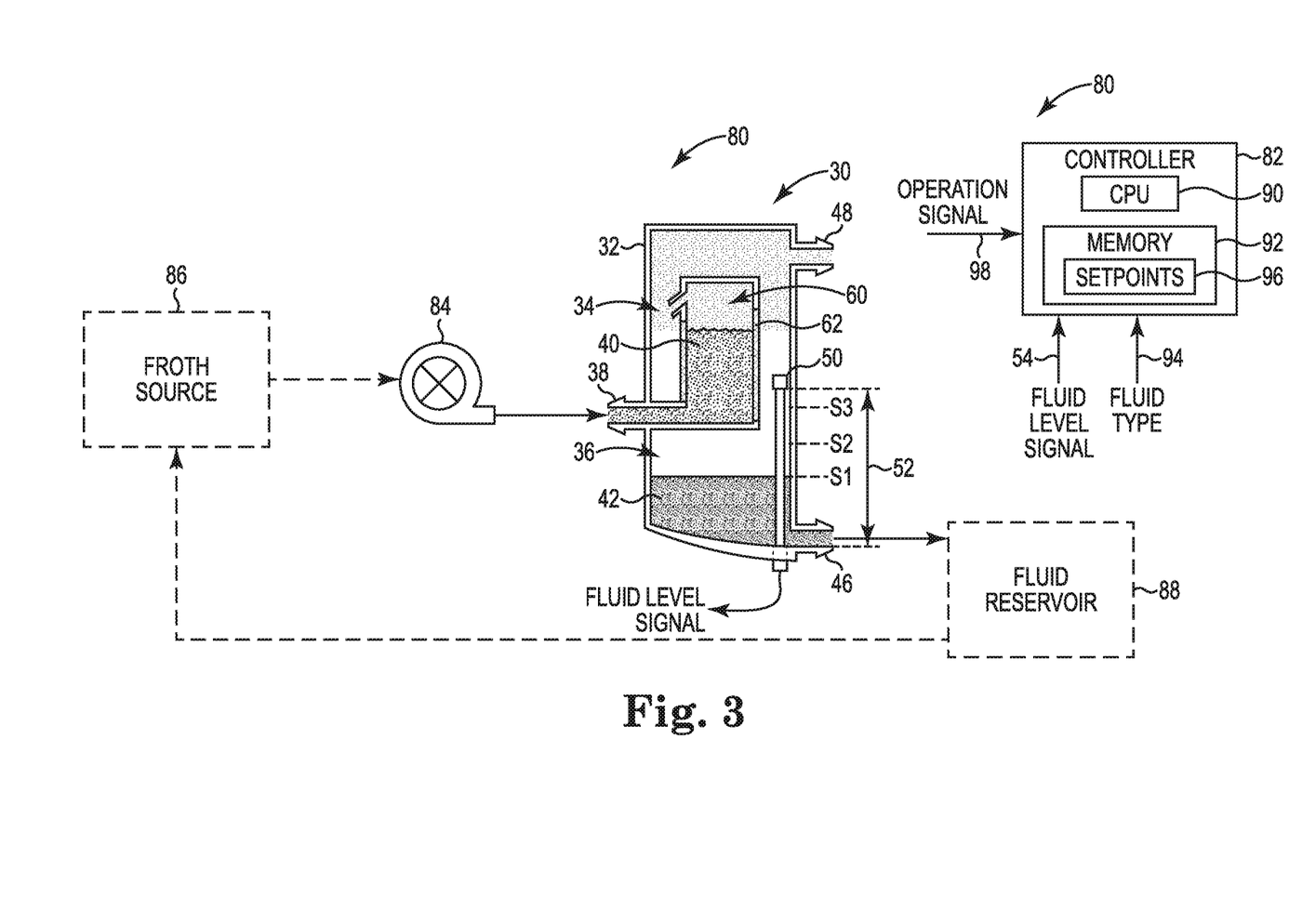
FIG. 3 is a block and schematic diagram generally illustrating a froth coalescing system, according to one example.

FIG. 3 is a block and schematic diagram generally illustrating a froth coalescing system 80 for a fluid delivery system, according to one example of the present disclosure. In one example, froth coalescing system 80, in addition to froth coalescing unit 30 (in accordance with the present disclosure), includes a froth pump 84 and an electronic controller 82. In one example, froth pump 84 is an adjustable speed pump which provides froth 40 to coalescing unit 30 via froth input port 38, such as from an external froth source 86. Froth coalescing unit 30 coalesces fluid 42 from froth 40, such as via filter screen 62 of froth receiving chamber 60, with coalesced fluid 42 being communicated from fluid output port 46, such as to an external fluid reservoir 88.

In one example, froth coalescing system 80 may be employed as part of a fluid ejection system (e.g., a printing system) with fluid source 86 being a fluid ejection assembly (e.g., a printhead), with the fluid 42 being ink, for instance, and froth 40 being a mixture of air and ink.

In operation, according to one example, as froth pump 84 pumps froth 40 into froth receiving chamber 60, multipoint liquid sensor 50 provides level measurements of coalesced fluid 42 in coalescing chamber 34 to electronic controller 82, with electronic controller 82 adjusting a speed of pump 84 to adjust a volume of froth 40 provided to froth receiving chamber 60 based on the level of coalesced fluid 42. In one example, as will be described in greater detail below, electronic controller 82 adjusts a speed of froth pump 84 so as to adjust a volume of froth 40 being provided to froth receiving chamber 60 of coalescing chamber 34 so as to maintain a level of coalesced fluid 42 below a setpoint level (e.g., S1, S2, S3) associated with the type of fluid 42 being circulated.

In one example, electronic controller 82 includes a processor (CPU) 90, a memory 92, firmware, software, and other electronics for communicating with and controlling froth coalescing system 80. Memory 92 can include volatile (e.g. RAM) and nonvolatile (e.g. ROM, hard disk, floppy disk, CD-ROM, etc.) memory components including computer/processor readable media that provide for storage of computer/processor executable coded instructions, data structures, program modules, and other data for operating froth coalescing system 80.

For instance, in one example, in addition to receiving fluid level signal 54 from multi-point fluid sensor 50 of coalescing unit 30, electronic controller 82 receives fluid type data 94 representative of the type of fluid 42 being circulated through froth coalescing system 80. In one example, fluid type data 94 is provided by a user. In one example, fluid type data 94 is received from external sources, such as from froth source 86 (e.g., a printhead assembly), or from fluid reservoir 88, for instance. In one example, electronic controller 82 includes a setpoint data 96 in memory 92 which associated with different types of fluid 42. For example, for a first type of fluid, setpoint data 96 may include an associated high level fluid setpoint level, such as setpoint S1, for instance, and an initial speed at which to operate froth pump 84.

In one example, upon receiving a coalescing operation signal 98, such as from froth source 86, for instance, electronic controller 82 determines a setpoint for both the initial operating speed of froth pump 84 and a high-level setpoint (e.g., S1, S2, S3) for coalesced fluid 42 in coalescing chamber 34 based on fluid type data 94. In one example, where fluid type data 94 is not present, electronic controller 82 employs default values for an initial operating speed for froth pump 84 and for a high-level setpoint for coalesced fluid 42 in coalescing chamber 34. In one example, electronic controller 82 initiates pumping froth 40 into froth receiving chamber 60 with froth pump 84 set at the initial operating speed. Electronic controller 82 subsequently monitors a level of coalesced fluid 42 in coalescing chamber 34 and reduces the operating speed of froth pump 84 if the fluid level provided by multipoint level switch 50 exceeds the high-level setpoint (e.g., S1, S2, S3, etc.).

Figure 4:
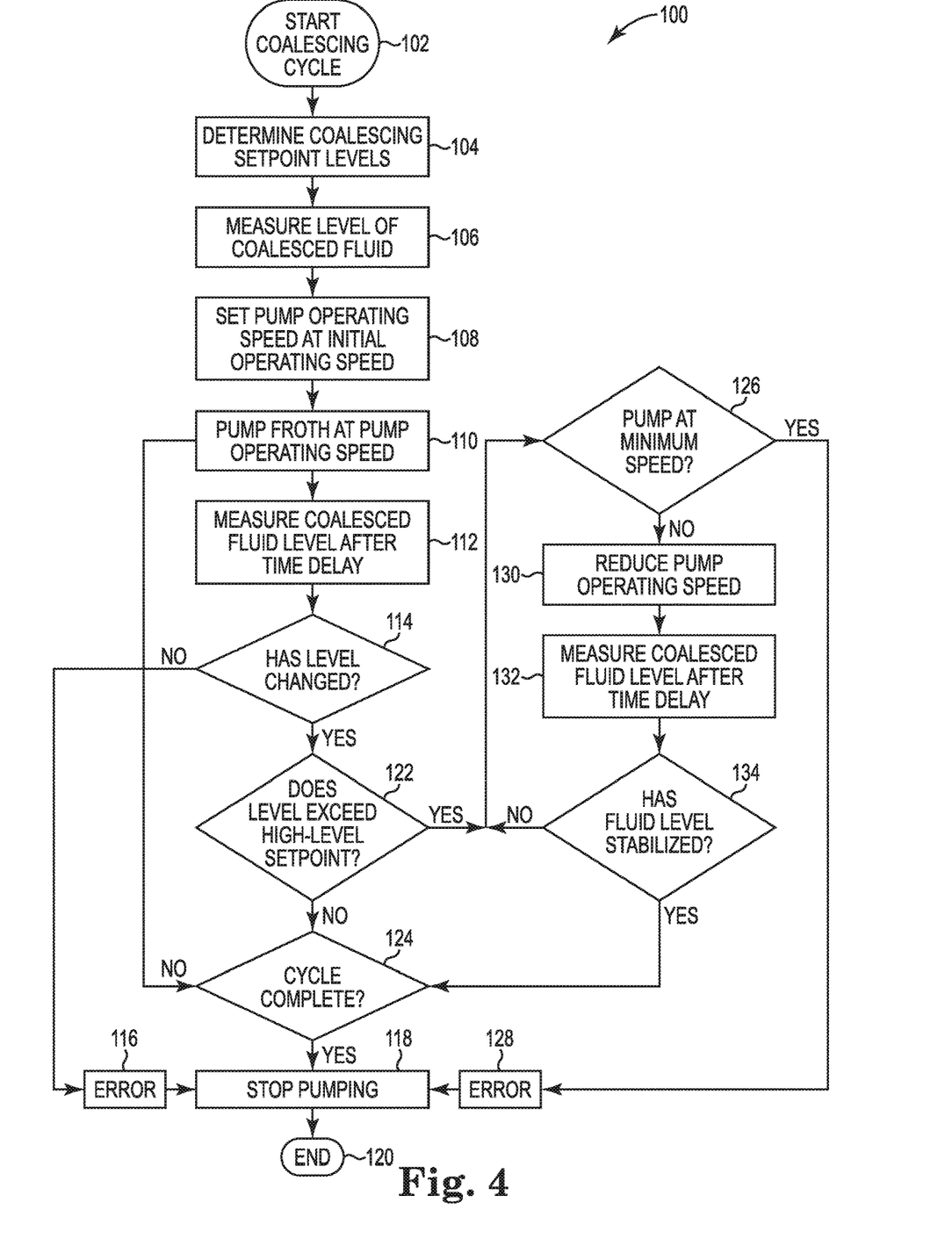
FIG. 4 is a flow diagram generally illustrating a method of operating a froth coalescing system, according to one example.

FIG. 4 is a flow diagram generally illustrating a method 100 for operating a froth coalescing system, in accordance with the present disclosure, such as froth coalescing system 80 of FIG. 3. Method 100 begins at 102 with initiation of a coalescing cycle, such as upon electronic controller 82 receiving an operation signal 98, such as from froth source 86 (e.g., a printhead of a printing system). In one example, electronic controller 82 may initiate a coalescing cycle after a predetermined amount of time has elapsed or after a predetermined amount of fluid has left an external source, such as froth source 86 or fluid reservoir 8, for instance.

At 104, setpoint values are determined for an initial operating speed of froth pump 84 and for a high-level setpoint of coalesced fluid 42 within coalescing chamber 34. In one example, electronic controller 84 selects such setpoints from predetermined setpoint data 96 stored in memory 92 based on fluid type data 94. In one example, electronic controller employs default setpoint values when setpoint data 94 is not available (e.g., not provided or not used).

At 106, electronic controller 82 measures an initial level of coalesced fluid 42 in coalescing chamber 34 via fluid level signal 54 provided by multipoint fluid level sensor 50. At 108, electronic controller 82 sets the operating speed of froth pump 84 to the initial operating speed, and at 110, instructs froth pump 84 to pump froth 40 to froth receiving chamber 60 at the pump operating speed.

At 112, after a time delay, electronic controller 82 measures the level of coalesced fluid 42 in coalescing chamber 34 via fluid level signal 54. At 114, method 100 queries whether the level of coalesced fluid 42 in coalescing chamber 32 has changed since the previous measurement. If the answer to the query at 114 is "NO", method 100 proceeds to 116 where an error indication is provided (e.g., a system leak, a malfunctioning froth pump 84), and then to 118 where electronic controller 82 stops froth pump 84, with method 100 being completed at 120.

If the answer to the query at 114 is "YES", meaning that the level of coalesced fluid 42 in coalescing chamber 34 has increased since the coalescing cycle began, method 100 proceeds to 122, where method 100 queries whether the level of coalesced fluid 42 in coalescing chamber 34 has exceed the selected high-level setpoint. If the answer to the query at 122 is "NO", method 100 proceeds to 124.

At 124, method 100 queries whether the coalescing cycle is complete. In one example, the coalescing cycle is complete after a predetermined time has elapsed since the coalescing cycle started at 102. In one example, the coalescing cycle is complete upon electronic controller having received a coalescing operation signal 98 directing electronic controller to end the coalescing cycle. If the answer to the query at 124 is "YES", method 100 proceeds to 118 where electronic controller 82 stops froth pump 84, with method 100 being completed at 120.

If the answer to the query at 122 is "YES", the level of coalesced fluid 42 in coalescing chamber 34 has exceeded the high-level setpoint, and method 100 proceeds to 126 where it is queried whether froth pump is at a minimum operating speed. In one example, the minimum operating speed of froth pump 182 is a pump operating limit stored as a setpoint value 96 in memory 92. If the answer to the query at 126 is "YES", method 100 proceeds to 128 where an error indication is provided (e.g., a blockage or an over-pressure condition in the fluid delivery system), and then to 118 where electronic controller 82 stops froth pump 84, with method 100 ending at 120.

If the answer to the query at 126 is "NO", method 100 proceeds to 130 where electronic controller 82 reduces the operating speed of froth pump 84. In one example, electronic controller 82 reduces the operating speed of froth pump 84 by a predetermined amount. In one example, electronic controller 82 reduces the operating speed of froth pump 84 based on a rate at which a level of coalesced fluid 42 is increasing as determined from previous level measurements and elapsed time between such measurements.

After reducing the operating speed of froth pump 82 at 130, method 100 proceeds to 132 where, after a time delay, the level of coalesced fluid 42 in coalescing chamber 34 is measured via multi-point level sensor 50. Method 100 then proceeds to 134 where it is queried whether the level of coalesced fluid 42 in coalescing chamber 34 has stabilized by comparing the measured fluid level at 132 with the most recent previous fluid level measurement. If the answer to the query at 134 is "NO", method 100 returns to 126. If the answer to the query at 134 is "YES", meaning that the fluid level has stabilized, method 100 proceeds to 124 where, as described above, it is queried whether the coalescing cycle is complete.

Figure 5:
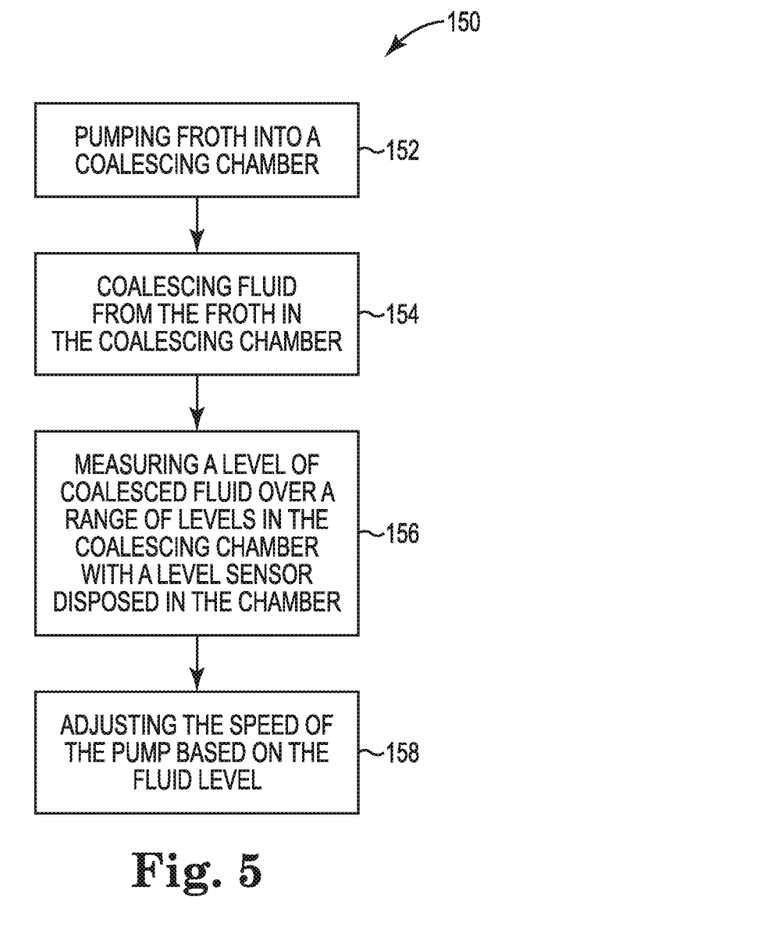
FIG. 5 is a flow diagram generally illustrating a method of operating a froth coalescing system, according to one example.

FIG. 5 is a flow diagram generally illustrating a method 150 of coalescing fluid in a fluid delivery system. At 152, method 150 includes pumping froth into a coalescing chamber with a pump, the froth being a mixture of fluid and gas, such as pump 84 pumping froth 40 into froth receiving chamber 60 of coalescing chamber 34, as illustrated by FIG. 3. At 154, method 150 includes coalescing fluid from the froth in the coalescing chamber, such as froth receiving chamber 60 of coalescing chamber 34 of FIG. 3 coalescing fluid 42 from froth 40. At 156, a level of coalesced fluid in the coalescing chamber is measured over a range of levels, such as multi-point fluid level sensor 50 measuring a level of coalesced fluid 42 in coalescing chamber 34 over a range of levels 52, as illustrated by FIG. 3. At 158, method 150 includes adjusting a speed of the pump based on the measured level of coalesced fluid in the coalescing chamber, such as electronic controller 82 adjusting a speed of froth pump 84 based on a level of coalesced fluid 42 as measured by multi-point level sensor 50 as illustrated by FIG. 3.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A froth coalescing unit comprising:
   a coalescing chamber including:
      a froth receiving chamber within the coalescing chamber, the froth receiving chamber including a vent to communicate gas from the froth receiving chamber into the coalescing chamber and at least one coalescing element to actively coalesce fluid from the froth; and
      a sump;
   an inlet to receive froth into a bottom portion of the froth receiving chamber of the coalescing chamber, the froth comprising a mixture of fluid and gas, the froth receiving chamber to coalesce the fluid from the froth with the coalesced fluid collecting at least in the sump;
   an outlet to communicate coalesced fluid from the sump; and
   a fluid level sensor to provide a level over a range of levels of coalesced fluid in the coalescing chamber including in the sump.

2. The froth coalescing unit of claim 1, further comprising a controller to execute instructions to:
   receive fluid type data representative of a type of fluid;
   determine a high-level setpoint associated with the type of fluid based on the fluid type data:
   select the high-level setpoint associated with the type of fluid;
   compare the selected high-level setpoint to the fluid level sensor level; and
   operate a pump, to provide froth to the coalescing chamber, based on the comparison between the high-level setpoint and the fluid level sensor level;
   wherein the instructions include selecting different high-level setpoints for different types of fluids.

3. The froth coalescing unit of claim 1, the fluid level sensor comprising a multi-point analog or digital level sensor.

4. The froth coalescing unit of claim 1, wherein the at least one coalescing element is in a portion of a vertical sidewall of the froth receiving chamber.

5. The froth coalescing unit of claim 1, the at least one coalescing element comprising a porous filter including an abraded surface positioned to be in contact with froth in the froth receiving chamber.

6. A coalescing system comprising:
   a pump to provide froth from a fluid ejection assembly, the froth comprising a mixture of gas and fluid;
   a froth coalescing unit including:
      a coalescing chamber including:
         a froth receiving chamber within the coalescing chamber, the froth receiving chamber including a vent to communicate gas from the froth receiving chamber into the coalescing chamber and at least one coalescing element to actively coalesce fluid from the froth; and
         a sump;
      an inlet to receive froth into a bottom portion of the froth receiving chamber of the coalescing chamber, the froth receiving chamber to coalesce the fluid from the froth with the coalesced fluid collecting at least in the sump;
      an outlet to communicate coalesced fluid from the sump; and
      a fluid level sensor to provide a level over a range of levels of coalesced fluid in the coalescing chamber including in the sump; and
   a controller to receive the level of the coalesced fluid from the fluid level sensor and adjust an operating speed of the pump based on the level of coalesced fluid.

7. The coalescing system of claim 6, the controller to execute instructions to further adjust the operating speed of the pump based on maintaining the level of coalesced fluid at or below a high-level setpoint corresponding to the fluid.

8. The coalescing system of claim 7, wherein the controller is to further execute instructions to:
   receive data representing a type of fluid received into the froth coalescing unit;
   determine a setpoint for an initial operating speed of the pump based on the type of fluid;
   determine the high-level setpoint of the sensor based on the type of fluid; and
   set the initial operating speed of the pump and the high-level setpoint of the sensor based on the type of fluid.

9. The coalescing system of claim 7, wherein the controller is to further execute instructions to:
   shut off the pump in response to the level of coalesced fluid being above the corresponding high-level setpoint and the pump being at a minimum operating speed.

10. The coalescing system of claim 7, wherein the controller is to further execute instructions to:
   shut off the pump in response to the level of coalesced fluid failing to change after initial start-up of the pump pumping froth into the coalescing chamber.

\* \* \* \* \*